US012762464B2

(12) United States Patent
Bouton

(10) Patent No.: US 12,762,464 B2
(45) Date of Patent: Oct. 13, 2026

(54) DATA SEARCHING SYSTEM AND METHOD

(71) Applicant: Certara USA, Inc., Radnor, PA (US)

(72) Inventor: Christopher M. L. Bouton, Newbury, MA (US)

(73) Assignee: Certara USA, Inc., Radnor, PA (US)

( * ) Notice: Subject to any disclaimer, the term of this patent is extended or adjusted under 35 U.S.C. 154(b) by 1086 days.

(21) Appl. No.: 17/477,069

(22) Filed: Sep. 16, 2021

(65) Prior Publication Data

US 2022/0004871 A1 Jan. 6, 2022

Related U.S. Application Data

(62) Division of application No. 15/923,868, filed on Mar. 16, 2018, now Pat. No. 11,216,725.

(60) Provisional application No. 62/479,872, filed on Mar. 31, 2017.

(51) Int. Cl.

| | |
|---|---|
| ***G06N 20/00*** | (2019.01) |
| ***G06F 16/2455*** | (2019.01) |
| ***G06F 16/28*** | (2019.01) |
| ***G06F 16/951*** | (2019.01) |
| ***G06F 16/9532*** | (2019.01) |
| ***G06N 5/022*** | (2023.01) |

(52) U.S. Cl.

CPC ....... *G06N 20/00* (2019.01); *G06F 16/24568* (2019.01); *G06F 16/285* (2019.01); *G06F 16/951* (2019.01); *G06F 16/9532* (2019.01); *G06N 5/022* (2013.01)

(58) Field of Classification Search

CPC ..... G06N 3/08; G06N 5/022; G06F 16/24568
See application file for complete search history.

(56) References Cited

U.S. PATENT DOCUMENTS

| | | | | |
|---|---|---|---|---|
| 11,216,725 B2 | | 1/2022 | Bouton | |
| 2013/0332460 A1 | * | 12/2013 | Pappas | G06F 16/35 707/740 |
| 2016/0140236 A1 | * | 5/2016 | Estes | G06F 16/951 707/709 |
| 2017/0061294 A1 | * | 3/2017 | Weston | G06F 16/3331 |
| 2018/0260680 A1 | * | 9/2018 | Finkelstein | G06N 5/04 |

OTHER PUBLICATIONS

S. Liu and T. Forss, "Automatic tag extraction from social media for visual labeling," 2015 7th International Joint Conference on Knowledge Discovery, Knowledge Engineering and Knowledge Management (IC3K), Lisbon, Portugal, 2015, pp. 504-510. (Year: 2015).*

* cited by examiner

*Primary Examiner* — Brian M Smith
*Assistant Examiner* — Corey M Sackalosky
(74) *Attorney, Agent, or Firm* — Choate, Hall & Stewart LLP; Michael D. Schmitt

(57) ABSTRACT

The present invention relates to a deep learning system suitable for searching data sources for specific content. In particular, the present invention relates to an unconventional machine-implemented process, leveraging a machine learning algorithm, to provide a technology that searches data sources and recognizes feature data associated with one or more predetermined classifiers.

9 Claims, 3 Drawing Sheets

DATA SEARCHING SYSTEM AND METHOD

CROSS-REFERENCE TO RELATED APPLICATION(S)

This application is a divisional of U.S. application Ser. No. 15/923,868 filed on Mar. 16, 2018, which claims priority to, and the benefit of, U.S. Provisional Application No. 62/479,872 filed on Mar. 31, 2017, the disclosures of each of which are hereby incorporated by reference in their entireties.

FIELD OF THE INVENTION

The present invention relates to a deep learning system suitable for searching data sources for specific content. In particular, the present invention relates to an unconventional machine-implemented process, leveraging a machine learning algorithm, to provide a technology that searches data sources and recognizes feature data associated with one or more predetermined classifiers.

BACKGROUND

Generally, data sources include unlimited potential for usable content. Data streams include information created and posted by users throughout a network. Common data sources include web feeds, news feeds, social media feeds, etc. Typically, other users can see the content posted on various data sources by subscribing or following a particular data stream. Additionally, the other users can search the data sources by scrolling through content or performing a standard search function.

However, these methodologies experience some shortcomings. In particular, searching one or more data sources can be limited to who a user is following and/or users can only search data feeds using traditional search methodologies not specifically designed for locating data within the data sources. Furthermore, there is a computer-centric and Internet-centric problem in existence in that the sheer volume of data being generated continuously means that it is difficult for users to find the most interesting or relevant information for their purposes. This is a classic "needle in the haystack" problem that is only getting worse by the day as more and more information is generated across data streams at ever increasing paces.

SUMMARY

There is a need for a system and method to extract specific information from a plurality of data sources in a manner that overcomes the above-identified computer-centric and Internet-centric problems. The present invention is directed toward further solutions to address this need, in addition to having other desirable characteristics. Specifically, the present invention provides an unconventional machine-implemented process, leveraging a machine learning algorithm, to provide a technology that searches data sources and can recognize feature data associated with one or more predetermined classifiers and extracts features (e.g., images, text blocks, the names of specific entities such as people, companies, products or any other class of entity type, generally referred to as named entities, etc.) from one or more data sources (e.g., social media post feeds, document sources, image repositories, etc.) based on one or more classifiers (e.g., hashtags, dictionaries of named entities, etc.) to enable dynamic updating of training sets for a machine learning algorithm (e.g., deep learning) such that it can identify specific criteria (e.g., named entities and their relationships, objects in images, etc.) of the features. Additionally, the algorithm, classifier signals and training sets can all be continuously updated to improve performance over time.

In accordance with example embodiments of the present invention, a system that automatically updates machine learning training sets and classifiers is provided. The system includes a data storage device storing a machine learning algorithm and machine learning training sets, the machine learning algorithm configured to reference the machine learning training sets. The system also includes a processor effectuating a recognition agent over at least one data source and a processor effectuating an extractor that aggregates feature data from the one or more data sources of the at least one data source based on one or more predetermined classifiers. The system further includes an input device receiving specific criteria and a processor effectuating an updater that dynamically updates the machine learning training sets and classifier dictionary based on the aggregated feature data and the specific criteria, enabling the machine learning algorithm to identify at least one feature data including the specific criteria from the aggregated feature data. The system also includes an output device transmitting the at least one feature data including the identified specific criteria. The machine learning algorithm, the machine learning training sets, and the classifier dictionary, are continuously updated to improve performance of the machine learning algorithm over time.

In accordance with aspects of the present invention, the effectuating the recognition agent over at least one data source includes the recognition agent denoting analytics in the data to aggregate feature data. The system can further include the recognition agent utilizing the machine learning algorithm to search the aggregated feature data for the at least one feature data that is associated with the predetermined classifiers and the specific criteria.

In accordance with aspects of the present invention, further includes a dictionary including the predetermined classifiers that are associated with specific criteria types. The specific criteria types can be at least one of medical, scientific, legal or news related information, and at least one feature can be at least one of an image, text, video, and audio. The predetermined classifiers can be at least one of hashtags or named entities.

In accordance with aspects of the present invention, the plurality of data sources are at least one of social media post feeds, text documents, tabular content or image repositories. The machine learning algorithm is a deep learning algorithm.

In accordance with example embodiments of the present invention, a method for automatically updating machine learning training sets and classifier dictionary is provided. The method includes storing a machine learning algorithm and machine learning training sets, the machine learning algorithm configured to reference the machine learning training sets. The method also includes a processor effectuating a recognition agent over one or more data sources of at least one data source and a processor effectuating an extractor that collects feature data from the one or more data sources of the at least one data source based on one or more predetermined classifiers. The method further includes an input device receiving specific criteria and a processor effectuating an updater that dynamically updates the machine learning training sets and classifier dictionary based on the collected feature data and the specific criteria, enabling the machine learning algorithm to identify at least one feature data including the specific criteria from the collected feature data, The method also includes an output device transmitting the at least one feature data including the identified specific criteria. The machine learning algorithm, the machine learning training sets, and the classifier dictionary, are continuously updated to improve performance of the machine learning algorithm over time.

In accordance with aspects of the present invention, the effectuating over at least one data source comprises the recognition agent denoting analytics in the data to aggregate feature data. The system can further include utilizing the machine learning algorithm to search the aggregated feature data for the at least one feature data that is associated with the predetermined classifiers and the specific criteria.

In accordance with aspects of the present invention, the system further includes a dictionary including the predetermined classifiers that are associated with specific criteria types. The specific criteria types can be at least one of medical, scientific, legal or news related information, and at least one feature can be at least one of an image, text, video, and audio. The predetermined classifiers can be at least one of hashtags or named entities.

In accordance with aspects of the present invention, the plurality of data sources are at least one of social media post feeds, text documents, tabular content or image repositories. The machine learning algorithm is a deep learning algorithm.

In accordance with example embodiments of the present invention, a method for searching for information related to posts in a plurality of data sources is provided. The method includes extracting at least one feature associated with one or more classifiers from the plurality of data sources, the one or more classifiers being identified from a classifier dictionary. The method also includes dynamically updating training sets for a machine learning algorithm and identifying specific criteria from the at least one feature utilizing the machine learning algorithm and the training sets. The method further includes aggregating the information from data sources of the plurality of data sources containing the identified specific criteria, providing the aggregated information for display in a searchable format, and updating, periodically, the training sets, the classifier dictionary, and the machine learning algorithm.

BRIEF DESCRIPTION OF THE FIGURES

These and other characteristics of the present invention will be more fully understood by reference to the following detailed description in conjunction with the attached drawings, in which.

DETAILED DESCRIPTION

An illustrative embodiment of the present invention relates to a system and method enabling searching for featured data over a plurality of data sources (e.g., data streams, data feeds, and other sources such as document repositories, databases, etc.). In particular, the present invention relates to searching for feature data associated with one or more predetermined classifiers within data sources. For example, a user can search multiple social network sites/feeds for information (e.g., feature data) associated with a predetermined classifier (e.g., a hashtag). The searching is performed by a system utilizing deep learning machine learning algorithms and training data sets. Deep learning approaches require training data in order to gain increasing discriminative capabilities over time. The present invention considers the utilization of existing classification signals (e.g., hashtags, named entities, etc.) embedded in data sources to act as structured data for use in the training of deep learning engines to enable advanced search, filtering and analytics of data source content. The inventive system introduces an unconventional machine-implemented process, leveraging a deep learning machine learning algorithm, to provide a machine-implemented technology that searches data sources for feature data associated with one or more predetermined classifiers, thereby enabling training of deep learning engines to enable advanced search, filtering and analytics of data source content.

Figure 1:
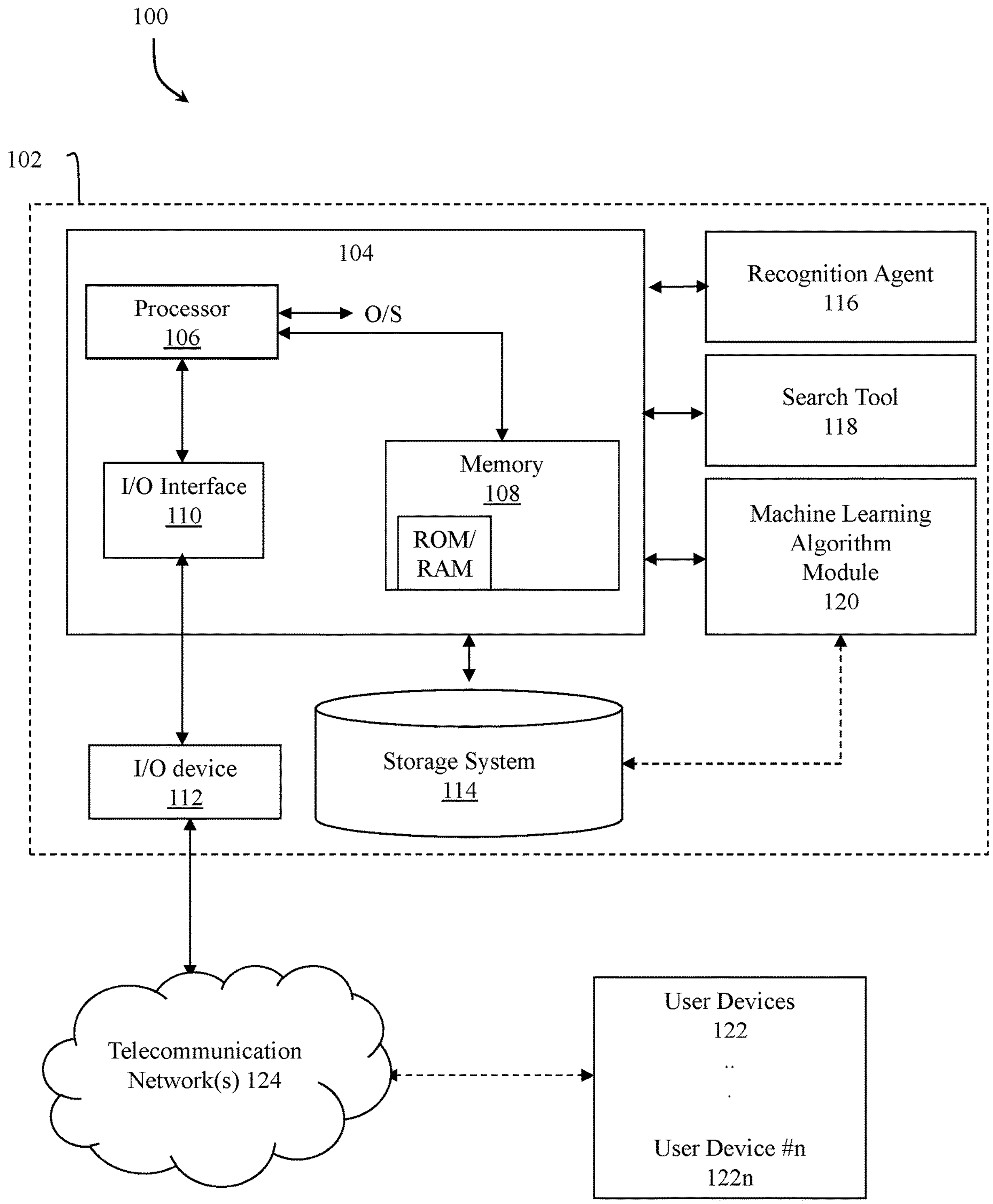
FIG. 1 is an illustrative environment for implementing the steps, in accordance with aspects of the present invention.
Figure 2:
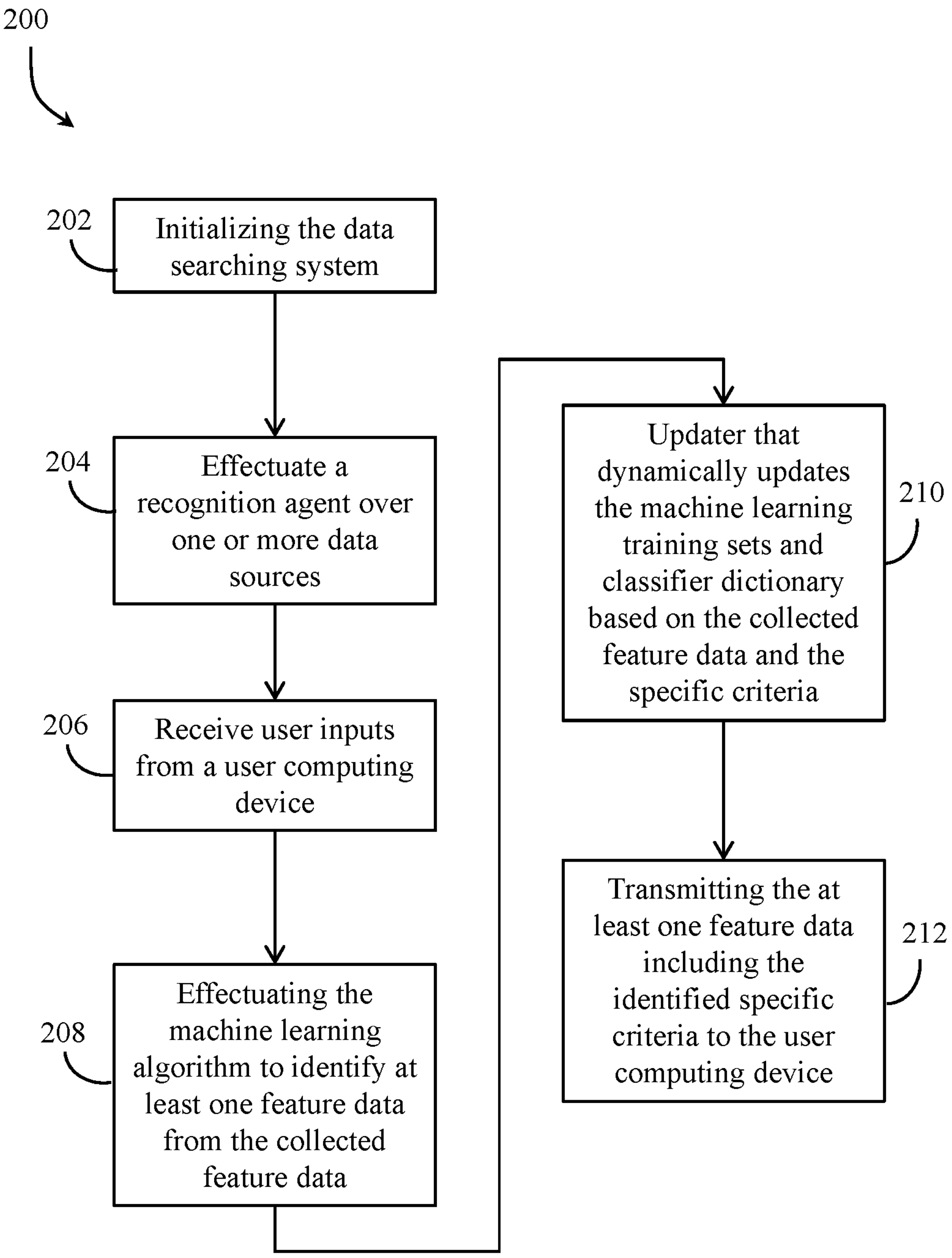
FIG. 2 is an illustrative flowchart depicting the operation of a data searching system, in accordance with aspects of the invention.
Figure 3:
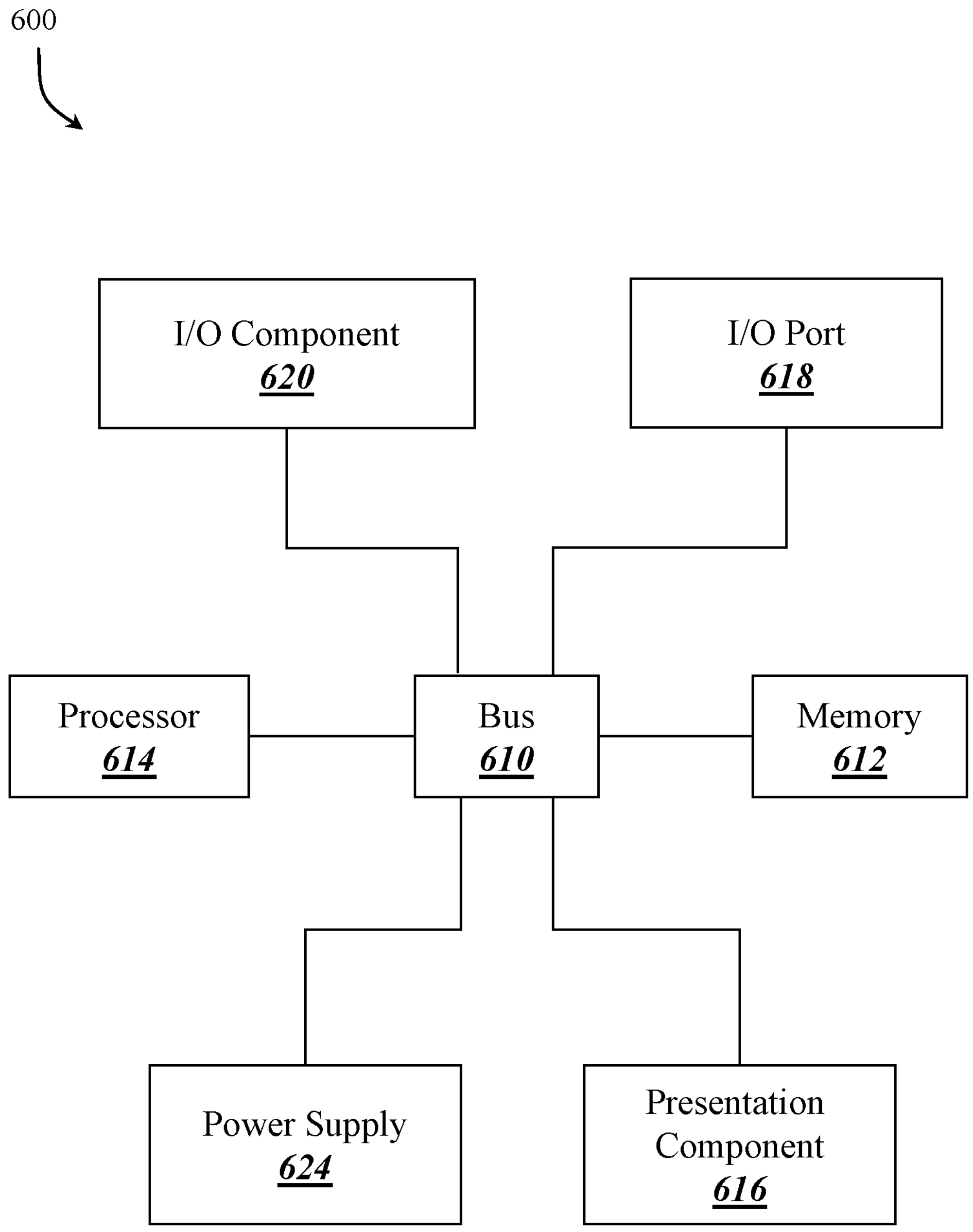
FIG. 3 is a diagrammatic illustration of a high level architecture for implementing processes in accordance with aspects of the invention.

FIGS. 1 through 3, wherein like parts are designated by like reference numerals throughout, illustrate an example embodiment or embodiments of searching data sources utilizing deep learning and classifiers, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

FIG. 1 depicts an illustrative system 100 for implementing the steps in accordance with the aspects of the present invention. In particular, FIG. 1 depicts a system 100 including a data searching system 102. In accordance with an example embodiment, the data searching system 102 is a combination of hardware and software configured to carry out aspects of the present invention. In particular, the data searching system 102 can include a computing system with specialized software and databases designed for providing a method for searching an analyzing data sources. For example, the data searching system 102 can be software installed on a computing device 104, a web based application provided by a computing device 104 which is accessible by computing devices (e.g., the user devices 122), a cloud based application accessible by computing devices, or the like. The combination of hardware and software that make up the data searching system 102 are specifically configured to provide a technical solution to a particular problem utilizing an unconventional combination of steps/operations to carry out aspects of the present invention. In particular, the data searching system 102 is designed to execute a unique combination of steps to provide a novel approach to searching for specific content throughout one or more data sources.

In accordance with an example embodiment of the present invention, the data searching system 102 can include a computing device 104 having a processor 106, a memory 108, an input output interface 110, input and output devices 112 and a storage system 114. Additionally, the computing device 104 can include an operating system configured to carry out operations for the applications installed thereon. As would be appreciated by one skilled in the art, the computing device 104 can include a single computing device, a collection of computing devices in a network computing system, a cloud computing infrastructure, or a combination thereof, as would be appreciated by those of skill in the art. Similarly, as would be appreciated by one of skill in the art, the storage system 114 can include any combination of computing devices configured to store and organize a collection of data. For example, storage system 114 can be a local storage device on the computing device 104, a remote database facility, or a cloud computing storage environment. The storage system 114 can also include a database management system utilizing a given database model configured to interact with a user for analyzing the database data.

Continuing with FIG. 1, the data searching system 102 can include a combination of core components to carry out the various functions of the present invention. In accordance with an example embodiment of the present invention, the data searching system 102 can include a recognition agent 116, a search tool 118, and a machine learning algorithm module 120. As would be appreciated by one skilled in the art, the recognition agent 116, the search tool 118, and the machine learning algorithm module 120 can include any combination of hardware and software configured to carry out the various aspects of the present invention. In particular, each of the recognition agent 116, the search tool 118, and the machine learning algorithm module 120 are configured to provide users with a system to search data sources for particular content.

In accordance with an example embodiment of the present invention, the system 100 can include a plurality of user devices 122 configured to communicate with the data searching system 102 over a telecommunication network(s) 124. The data searching system 102 can act as a centralized host, for the user devices 122, providing the functionality of the modules 116, 118, 120, sharing a secured network connection. As would be appreciated by one skilled in the art, the plurality of user devices 122 can include any combination of computing devices, as described with respect to the data searching system 102 computing device 104. For example, the computing device 104 and the plurality of user devices 122 can include any combination of servers, personal computers, laptops, tablets, smartphones, etc. In accordance with an example embodiment of the present invention, the computing devices 104, 122 are configured to establish a connection and communicate over telecommunication network(s) 124 to carry out aspects of the present invention. As would be appreciated by one skilled in the art, the telecommunication network(s) 124 can include any combination of known networks. For example, the telecommunication network(s) 124 may be combination of a mobile network, WAN, LAN, or other type of network. The telecommunication network(s) 124 can be used to exchange data between the computing devices 104, 122, exchange data with the storage system 114, and/or to collect data from additional sources.

In accordance with an example embodiment of the present invention, the recognition agent 116 is configured to scan through one or more data sources and aggregate data provided within those data sources. As would be appreciated by one skilled in the art, the recognition agent 116 can aggregate all of the data available within the data sources or can selectively aggregate data based on predetermined classifiers. For example, the recognition agent 116 can selectively aggregate all data associated with one or more predetermined classifiers. The predetermined classifiers can include markers or metadata tags that are commonly utilized by the data sources being targeted. For example, a hashtag can be a predetermined classifier associated with information when searching social media. As would be appreciated by one skilled in the art, identifying classifiers and the data associated with the classifiers can be performed utilizing any combination of methods known in the art (e.g., tokenization). By selectively aggregating data associated with classifiers, the data searching system 102 can operate more efficiently. Similarly, the recognition agent 116 can aggregate all data from the data sources and parse out the data associated (e.g., feature data) with predetermined classifiers (e.g., hash tags) in a later step. The recognition agent 116 stores (e.g., in the storage system 115) all of the aggregated data for additional processing (e.g., by the machine learning algorithm module 118).

In accordance with an example embodiment of the present invention, the search tool 118 is configured to manage a search functionality provided by the data searching system 102. Managing the search functionality can include providing the means for generating a graphical user interface (GUI) configured to receive an input for a search from a user. The GUI can include a search bar, a search execution button, and any combination of filters to be applied to the search. Additionally, the search tool 118 can include a dictionary for recognizing the search terms and search operators from the user input. In an example embodiment, the dictionary is a list of the names of entities in which the user is interested, for example, a list of the names of companies or people or products that the user may be interested in analyzing. The user adds this dictionary to the system and the system can then use that dictionary as a training set to identify additional novel entities of the same or similar types. The search operators can be any combination of search operators known in the art (e.g., Boolean, truncation, etc.). As would be appreciated by one skilled in the art, distinguishing between the search terms and search operators can be performed utilizing any combination of lexical analysis methods known in the art (e.g., tokenization).

The managing of the search functionality provided by the search tool 118 also includes providing the user input and user instructions (e.g., search, operators, etc.) for processing by the data searching system 102. The instructions can be derived by the search tool 118 by identifying search operators (e.g., utilizing the dictionary) and other filters provided by the user input. In particular, the search tool 118 can provide the user inputs and derived instructions to the machine learning algorithm module 120 for processing (e.g., execution of the search). Additionally, the search tool 118 will receive results of the processing (e.g., search) back from the machine learning algorithm module 120 and provide those results to the user in a displayable format. In particular, the search results received from the machine learning algorithm module 120 can be transformed into a format readable by a user receiving the results. The results of the search can be transformed and provided to the user utilizing any methodology known in the art. In accordance with an example embodiment, the search results are provided to the user in the GUI.

In accordance with an example embodiment of the present invention, the machine learning algorithm module 120 controls the logic for executing the search. In particular, the machine learning algorithm module 120 utilizes a deep learning algorithm(s) to identify specific information or criteria from the aggregated data (e.g., provided by the recognition agent 116) according to a user's criteria and/or instructions (e.g., provided by the search tool 118). In an example embodiment, user search terms are used to identify a set of content that has matching terms to the user search terms. This same set of content will also contain terms provided by the user in one or more dictionaries as well as additional classifiers and feature data detected by the system. In aggregate, this full set of content is what can be returned to the user in the results of a search. The machine learning algorithm module 120 utilizes training sets of data for carrying out the operation of the deep learning algorithm (s). Additionally, the machine learning algorithm module 120 is configured to manage the deep learning algorithms, the dictionary for classifies, and the training sets (e.g., in storage system 114). In particular, the machine learning algorithm module 120 can dynamically update the training sets and the dictionary of classifiers to improve performance of the deep learning over time.

The present invention provides a system that automatically updates machine learning training sets and dictionary. The system includes data storage configured for storing a machine learning algorithm and machine learning training sets. The machine learning algorithm can include any combination of machine learning software and hardware systems known in the art. As would be appreciated by one skilled in the art, machine learning algorithms are utilized to employ artificial intelligence to learn and make predictions on data. Typically machine learning algorithms function by constructing a model from example inputs to make the data driven predictions and/or decisions.

In accordance with an example embodiment of the present invention, the machine learning algorithm is configured to reference the machine learning training sets for the example inputs. The training sets are sets of data used to discovery the potential predictive relationships by the machine learning algorithm. In particular, the training set includes an input vector and an answer vector, which utilized in combination with a learning method can train a knowledge database used by the system. In other words, the training sets are models that provide the system with information to identify apparent relationships in the training data. For example, a list of company names (e.g., the named entities) might be found in a large set of sentences contained in the system. These sentences would act as the training set for the system to learn about characteristics of sentences about companies. Once trained the system can then recognize other sentences about companies even if the sentences recognized contain completely brand new companies that the system has not yet been given as a dictionary entity. As would be appreciated by one skilled in the art, the training sets utilized by the present invention can be configured to provide the machine learning algorithm with the information necessary (e.g., via definitions) to identify apparent relationships and novel instances of data features utilizing any methodology known in the art to be used in accordance with the present invention (e.g., searching social media for particular criteria).

In accordance with an example embodiment of the present invention, the machine learning algorithm(s), as discussed herein, is employed in a deep learning architecture. The deep learning architecture is employed to make improved representations and create models (e.g., training sets) to learn such representation from sizeable collections of data (e.g., social media, aggregated data sources, etc.). In particular, deep learning algorithms transform inputs to outputs by processing the inputs through a plurality of layers (e.g., a credit assignment path (CAP)). Each of the layers provides another level of abstraction and with each additional layer the deep learning algorithm has a greater "depth". As would be appreciated by one skilled in the art, any combination of deep learning architectures or other similar architectures (e.g., neural networks) can be utilized in the system of the present invention without departing from the scope of the present invention.

An example implementation of the present invention is provided in which every sentence from every data source in an aggregated set of all such sentences for a data source are searched for specific data (e.g., user search input), however, the present invention is not intended to be limited to implementation on sentences from data sources and can be utilized with any combination of data sources. In operation, in accordance with an example embodiment of the present invention, the system employs a processor 106 configured to effectuate a recognition agent (e.g., recognition agent module 116) over one or more data sources of at least one data source. The recognition agent aggregates data from the one or more data sources of at least one data source. For example, the recognition agent aggregates posted data over a plurality of social media channels, pages, etc. The processor is further configured to effectuate an extractor that collects feature data from the one or more data sources of the at least one data source based on one or more predetermined classifiers as defined by a dictionary. The feature data includes any combination of data, associated with the one or more predetermined classifiers as defined by the dictionary, that is included within data sources. Similarly, the one or more predetermined classifiers can include objects or tags frequently associated with the at least one data source. For example, the feature data can include images, text, video, audio, links, etc. posted in a plurality of social media feeds and the one or more predetermined classifiers can include hash tags, likes, shares, named entities, etc. associated with the feature data.

In accordance with an example embodiment of the present invention, the system is configured with an input device configured to receive specific criteria. The specific criteria is supplied by a user running an application in accordance with the present invention (e.g., a mobile app, web portal, web search, software application etc.). For example, the system can receive input search strings including specific criteria related to a search for health related information (e.g., trials, research, groups, etc.) for a specific medical condition. As would be appreciated by one skilled in the art, the user can enter specific parameters for classifiers, data sources, and other parameters for aggregating the feature data. For example, the user can specific to only aggregate data from social media data sources and parse data according to a specific classifier of a hash tag.

In accordance with an example embodiment of the present invention, the processor is also configured to effectuate an updater that dynamically updates the machine learning training sets and classifier dictionary based on the collected feature data and the specific criteria, enabling the machine learning algorithm to identify at least one feature data including the specific criteria from the collected feature data. For example, the system can identify at least one image, video, named entities, etc. (e.g., feature data) associated with the search entered by the user (e.g., the specific criteria at a data source). Continuing the example, the system can identify sentences that contain mention of a given type of named entity (e.g., companies, people, products, etc.) have a general structure to them that is comprised of grammar, words used, phrasing, etc. The system can use its training on these content sets to thereby recognize novel instances of similar sentences and thus novel named entities in these similar sentences. The training sets, machine learning algorithm, and classifier dictionary can be updated, to reflect the newly identified at least one feature data, utilizing any combination of methodologies known in the art. Once at least one feature data is identified, an output device transmits the at least one feature data including the identified specific criteria to the requesting user (e.g., via a mobile app, web portal, web search, software application etc.). For example, the at least one feature data matching the user specified specific criteria are returns and presented to the user via a graphical user interface.

In accordance with an example embodiment of the present invention, the machine learning algorithm, the machine learning training sets, and the classifier dictionary, are continuously updated to improve performance of the deep learning algorithm over time. Such technical improvements lead to faster and more efficient searching of numerous data sources as well as improved search results according to user defined parameters not currently available in conventional search engines.

As would be appreciated by one skilled in the art, the feature data can be searched for associations with the specific criteria utilizing any alternative and/or modified methodology known in the art. In accordance with an example embodiment of the present invention, a method for searching for information related to posts in a plurality of data sources includes extracting at least one feature data associated with one or more classifiers from all feature data presented on a plurality of data sources. The at least one feature can be identified by a crawling through the data sources on the networks for data features associated with a classifier containing identified specific criteria provided by a user input. Identifying specific criteria from the at least one feature includes utilizing the machine learning algorithm and the training sets, as discussed herein along with the one or more classifiers identified in a classifier dictionary. For example, a data source is searched for one or more classifiers (e.g., hash tags, named entities, etc.) and the feature data associated with any identified classifiers is analyzed for associations with the specific criteria. Any feature data (e.g., at least one feature data) determined to be associated with the specific criteria is aggregated by the system. In particular, the system aggregates the information included within the at least one feature from data sources o and provides the aggregated information for display in a searchable format back to a user. Additionally, the system dynamically updates training sets, the classifier dictionary, and the machine learning algorithm, as discussed herein.

FIG. 2 shows an exemplary flow chart depicting an example implementation of the present invention. Specifically, FIG. 2 depicts an exemplary flow chart showing the operation of the data searching system 102, as discussed with respect to FIG. 1. In particular, FIG. 2 depicts a process 200 for carrying out the searching of data sources of the present invention. At step 202, the process 200 initializes the data searching system 102 with the machine learning algorithm and machine learning training sets stored thereon. As discussed with respect to FIG. 1, the machine learning algorithm is configured to reference the machine learning training sets during operation of the data searching system 102. At step 204, the process 200 effectuates a recognition agent over one or more data sources of at least one data source. In particular, the process 200 initiates a processor (e.g., processor 106) to execute the recognition agent 116 to aggregate data over one or more data sources.

At step 206, the process effectuates an extractor that collects feature data from the one or more data sources of the at least one data source based on one or more predetermined classifiers. In particular, the process 200 initiates a processor (e.g., processor 106) to execute the recognition agent 116 to parse out feature data from the aggregated data from the one or more data sources. The feature data can be identified and extracted based on an association with one or more predetermined classifiers. For example, feature data can be extracted from the aggregated data from a social network data source based on data associated with a hash tag. As discussed with respect to FIG. 1, the parsing can include identifying a particular subset of data (e.g., user posts on a social media stream) from the data sources. At step 206, the process 200 receives a user input for executing a search from a user computing device 122. In particular, the process 200 receives from a GUI managed by the search tool 116 a user input provide by the user computing device 122 presenting the GUI. The user input can include search terms and instructions for how to execute the search (e.g., Boolean operators).

At step 208, the process 200 effectuates the machine learning algorithm to identify at least one feature data from the collected feature data. The process of effectuating the recognition agent over at least one data source includes the recognition agent denoting analytics in the data In particular, the step 208 causes the recognition agent 116 to utilize the machine learning algorithm to search the aggregated feature data for at least one feature data that is associated with a specific criteria (e.g., user entered search terms, dictionaries, parameters, etc.). In accordance with an example embodiment of the present invention, the specific criteria are the search terms provided by the user input in step 206. At step 210, the process 200 initiates an updater that dynamically updates the machine learning training sets and classifier dictionary based on the collected feature data and the specific criteria. In particular, the process 200 updates the machine learning algorithm to incorporate additional collected content in order to train the system for better recognition capability. The machine learning algorithm, the machine learning training sets, and the classifier dictionary, are continuously updated to improve performance of the machine learning algorithm over time. At step 212, the process 200 initiates an output device to transmit the at least one feature data including the identified specific criteria to the user computing device 212. In particular, the process 200 instructs the search tool 116 to present the search results (e.g., the at least one feature data) to the user in a displayable format.

Any suitable computing device can be used to implement the computing devices 102, 104, 122 and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 600 is depicted in FIG. 3. The computing device 600 is merely an illustrative example of a suitable computing environment and in no way limits the scope of the present invention. A "computing device," as represented by FIG. 3, can include a "workstation," a "server," a "laptop," a "desktop," a "hand-held device," a "mobile device," a "tablet computer," or other computing devices, as would be understood by those of skill in the art. Given that the computing device 600 is depicted for illustrative purposes, embodiments of the present invention may utilize any number of computing devices 600 in any number of different ways to implement a single embodiment of the present invention. Accordingly, embodiments of the present invention are not limited to a single computing device 600, as would be appreciated by one with skill in the art, nor are they limited to a single type of implementation or configuration of the example computing device 600.

The computing device 600 can include a bus 610 that can be coupled to one or more of the following illustrative components, directly or indirectly: a memory 612, one or more processors 614, one or more presentation components 616, input/output ports 618, input/output components 620, and a power supply 624. One of skill in the art will appreciate that the bus 610 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 3 is merely illustrative of an exemplary computing device that can be used to implement one or more embodiments of the present invention, and in no way limits the invention.

The computing device 600 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 600.

The memory 612 can include computer-storage media in the form of volatile and/or nonvolatile memory. The memory 612 may be removable, non-removable, or any combination thereof. Exemplary hardware devices are devices such as hard drives, solid-state memory, optical-disc drives, and the like. The computing device 600 can include one or more processors that read data from components such as the memory 612, the various I/O components 616, etc. Presentation component(s) 616 present data indications to a user or other device. Exemplary presentation components include a display device, speaker, printing component, vibrating component, etc.

The I/O ports 618 can enable the computing device 600 to be logically coupled to other devices, such as I/O components 620. Some of the I/O components 620 can be built into the computing device 600. Examples of such I/O components 620 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about" and "approximately" are intended to cover variations that may existing in the upper and lower limits of the ranges of subjective or objective values, such as variations in properties, parameters, sizes, and dimensions. In one non-limiting example, the terms "about" and "approximately" mean at, or plus 10 percent or less, or minus 10 percent or less. In one non-limiting example, the terms "about" and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method for use in searching data sources for specific criteria and automatically updating machine learning training sets and classifier, the method comprising:

storing a machine learning algorithm and machine learning training sets, wherein the machine learning algorithm is configured to reference the machine learning training sets;

a processor effectuating a recognition agent over one or more data sources;

a processor effectuating an extractor that collects feature data from the one or more data sources using one or more predetermined classifiers stored in a classifier dictionary of predetermined classifiers, wherein the predetermined classifiers comprise one or more hashtags;

an input device receiving specific criteria;

a processor effectuating an updater that dynamically updates the machine learning training sets and the classifier dictionary based on the collected feature data from the one or more data sources and the specific criteria, enabling the machine learning algorithm to identify at least one feature data including the specific criteria from the collected feature data; and an output device transmitting the at least one feature data including the identified specific criteria;

wherein the machine learning algorithm, the machine learning training sets, and the classifier dictionary, are continuously updated, using the updater, based on a plurality of received specific criteria and corresponding feature data collected from the extractor to improve performance of the machine learning algorithm over time, and wherein the machine learning algorithm is a deep learning algorithm.

2. The method of claim 1, wherein the effectuating over the one or more data sources comprises the recognition agent denoting analytics in the data to aggregate feature data.

3. The method of claim 2, further comprising utilizing the machine learning algorithm to search the aggregated feature data for the at least one feature data that is associated with the predetermined classifiers and the specific criteria.

4. The method of claim 1, wherein the predetermined classifiers are associated with specific criteria types.

5. The method of claim 4, wherein the specific criteria types are at least one of medical, scientific, legal or news related information, and at least one feature is at least one of an image, text, video, and audio.

6. The method of claim 4, wherein the predetermined classifiers comprise named entities.

7. The method of claim 1, wherein the one or more data sources are at least one of social media post feeds, text documents, tabular content or image repositories.

8. A method for searching for information related to posts in a plurality of data sources, the method comprises:

extracting at least one feature associated with one or more classifiers from a plurality of data sources, the one or more classifiers being identified from a classifier dictionary of predetermined classifiers, wherein the one or more predetermined classifiers comprise one or more hashtags;

dynamically updating training sets for a machine learning algorithm and identifying specific criteria from the at least one feature utilizing the machine learning algorithm and the training sets;

aggregating information from data sources of the plurality of data sources containing the identified specific criteria, providing the aggregated information for display in a searchable format; and updating, periodically, the training sets, the classifier dictionary, and the machine learning algorithm by repeatedly performing (i) the step of extracting to extract a plurality of features and (ii) the step of dynamically updating the training sets based on the plurality of features, wherein the machine learning algorithm is a deep learning algorithm.

9. The method of claim 8, wherein the plurality of data sources comprise posts comprising hashtags.

* * * * *